(12) United States Patent
Borden et al.

(10) Patent No.: US 10,298,700 B2
(45) Date of Patent: May 21, 2019

(54) SYSTEM AND METHOD FOR ONLINE MONITORING OF AND INTERACTION WITH CHAT AND INSTANT MESSAGING PARTICIPANTS

(75) Inventors: Walter W. Borden, New York, NY (US); Alexander Abrams, New York, NY (US); Dana S. Spiegel, New York, NY (US)

(73) Assignee: Artimys Technologies LLC, Bernardsville, NJ (US)

( * ) Notice: Subject to any disclaimer, the term of this patent is extended or adjusted under 35 U.S.C. 154(b) by 2483 days.

(21) Appl. No.: 10/606,517

(22) Filed: Jun. 25, 2003

(65) Prior Publication Data
US 2004/0111479 A1    Jun. 10, 2004

Related U.S. Application Data

(60) Provisional application No. 60/391,527, filed on Jun. 25, 2002.

(51) Int. Cl.
*G06F 13/00* (2006.01)
*H04L 29/08* (2006.01)
(Continued)

(52) U.S. Cl.
CPC .......... *H04L 67/22* (2013.01); *G06Q 10/107* (2013.01); *H04L 12/1813* (2013.01);
(Continued)

(58) Field of Classification Search
CPC ......... H04L 51/12; H04L 51/00; H04L 51/04; H04L 51/14; H04L 67/22; H04L 12/1813;
(Continued)

(56) References Cited

U.S. PATENT DOCUMENTS 6,161,130 A * 12/2000 Horvitz et al. ............... 709/206
6,212,548 B1    4/2001 DeSimone et al.
(Continued)

FOREIGN PATENT DOCUMENTS

WO    00/08573 A1    2/2000

OTHER PUBLICATIONS

K. Jones, "Filtering Software Offers a Safety Net for Kids Online." Dec. 28, 2000, Los Angeles Times, Home Edition.
(Continued)

*Primary Examiner* — Kenneth R Coulter
(74) *Attorney, Agent, or Firm* — Dentons US LLP

(57) ABSTRACT

A method and system for on-line monitoring of electronic communications include automatically monitoring text-based communications of one or more chat room or instant messaging participants to determine if a monitoring event has occurred. A monitoring event can be, for example, the combined existence of certain defined factors associated with a particular exchange relating to, for example, the exchange's participants, content, recent history, and/or tone. The existence of a monitoring event can result in one or more predetermined actions being taken by the system. In an exemplary embodiment of the present invention, on-line communications are continually monitored and input to a number of pattern recognizing modules, preferably working in parallel. Using known pattern-recognition techniques, each pattern recognizing module can analyze an aspect of such communications by implementing certain algorithms and, as appropriate, set, increase or decrease the values of one or more state variables descriptive of one or more defined attributes of the online communications. Such state variables can reflect, for example, emotional levels, participant turnover frequencies, use of suspicious word patterns, and other metrics regarding the on-line communications.

(Continued)

State variables out put form the various pattern recognizing modules can be simultaneously input to a decision module which can launch one or more decision algorithms. The decision module can then output one or more predetermined actions as determined by the decision algorithms.

88 Claims, 2 Drawing Sheets

(51) Int. Cl.
    *G06Q 10/10* (2012.01)
    *H04L 12/18* (2006.01)
    *H04L 29/06* (2006.01)
    *H04L 12/26* (2006.01)
    *H04L 12/58* (2006.01)

(52) U.S. Cl.
    CPC ............. *H04L 29/06* (2013.01); *H04L 43/00* (2013.01); *H04L 51/04* (2013.01); *H04L 69/329* (2013.01)

(58) Field of Classification Search
    CPC ....... H04L 29/06; H04L 43/00; H04L 69/329; G06Q 10/10; G06Q 10/107
    USPC ............. 709/224, 204–207, 229; 726/22–27; 715/751–759
    See application file for complete search history.

(56) References Cited

U.S. PATENT DOCUMENTS

| | | | |
|---|---|---|---|
| 6,336,133 B1* | 1/2002 | Morris et al. ................. | 709/204 |
| 6,339,784 B1 | 1/2002 | Morris et al. | |
| 6,357,008 B1 | 3/2002 | Nachenberg | |
| 6,389,472 B1* | 5/2002 | Hughes et al. ............... | 709/229 |
| 6,507,866 B1 | 1/2003 | Barchi | |
| 6,792,412 B1* | 9/2004 | Sullivan ............ | G06F 17/30648 706/25 |
| 6,826,618 B2* | 11/2004 | Morris et al. ................. | 709/229 |
| 6,912,571 B1* | 6/2005 | Serena .......................... | 709/224 |
| 7,032,007 B2* | 4/2006 | Fellenstein et al. .......... | 709/206 |
| 7,039,700 B2* | 5/2006 | Saeidi ........................... | 709/224 |
| 7,194,536 B2* | 3/2007 | Fellenstein et al. .......... | 709/224 |
| 7,613,779 B2* | 11/2009 | Morris et al. ................. | 709/206 |
| 8,140,703 B2* | 3/2012 | Morris et al. ................. | 709/233 |
| 9,560,064 B2* | 1/2017 | Chasin .................... | H04L 51/12 |
| 9,571,435 B2* | 2/2017 | Lu ............................ | H04L 51/12 |
| 10,084,734 B2* | 9/2018 | Lu ............................ | H04L 51/12 |
| 2002/0004907 A1 | 1/2002 | Donahue | |
| 2002/0103862 A1* | 8/2002 | Burr ............................ | 709/204 |
| 2002/0152305 A1* | 10/2002 | Jackson .................. | H04L 43/00 709/224 |
| 2002/0174183 A1 | 11/2002 | Saeidi | |
| 2002/0198940 A1* | 12/2002 | Bower ................ | H04L 12/1822 709/204 |
| 2003/0046273 A1* | 3/2003 | Deshpande ......... | G06F 17/3087 |
| 2003/0105815 A1* | 6/2003 | Gusler et al. ................. | 709/204 |
| 2003/0105822 A1* | 6/2003 | Gusler et al. ................. | 709/206 |
| 2004/0083270 A1* | 4/2004 | Heckerman ............. | H04L 51/12 709/207 |
| 2004/0158631 A1* | 8/2004 | Chang et al. ................. | 709/224 |
| 2004/0236832 A1* | 11/2004 | Morris et al. ................. | 709/204 |
| 2004/0243627 A1* | 12/2004 | Jensen et al. ............. | 707/104.1 |
| 2007/0208856 A1* | 9/2007 | Rounthwaite ........... | H04L 51/12 709/225 |
| 2010/0138512 A1* | 6/2010 | Morris et al. ................. | 709/207 |
| 2013/0067003 A1* | 3/2013 | Heikes .................... | H04L 51/04 709/206 |
| 2016/0072747 A1* | 3/2016 | Lu ............................ | H04L 51/12 709/206 |
| 2016/0072749 A1* | 3/2016 | Lu ............................ | H04L 51/12 709/206 |
| 2016/0156654 A1* | 6/2016 | Chasin .................... | H04L 51/12 726/23 |

OTHER PUBLICATIONS

A. Meehan et al., "Packet Sniffing for Automated Chat Room Monitoring and Evidence Preservation," Proceedings of the 2001 IEEE, Workshop on Information and Security, United States Military Academy, West Point, NY Jun. 5-6, 2001.

Olly Downs, Hopfield Group, "Learning Models for Continuous Nonnegative Data," Apr. 18, 2000.

Testimony of Dan Jude, President, Security Software Systems, Inc. before the COPA Commission, Aug. 4, 2000, San Jose, CA.

* cited by examiner

SYSTEM AND METHOD FOR ONLINE MONITORING OF AND INTERACTION WITH CHAT AND INSTANT MESSAGING PARTICIPANTS

CROSS-REFERENCE TO RELATED APPLICATIONS

This application claims the benefit of U.S. Provisional Patent Application Ser. No. 60/391,527, filed on Jun. 25, 2002, which is hereby fully incorporated by reference herein.

TECHNICAL FIELD

This application relates to the automated monitoring of computer communications networks. More particularly this application relates to a system and method for monitoring the conduct of participants, and the content of messages in online chat rooms, instant messaging environments and related electronic communications arenas.

BACKGROUND INFORMATION

The Internet has become a pervasive element of society. A rapidly growing portion of the population now has access to the Internet (which most people access via "web pages" found on the World Wide Web, or the "web"). With the increasing use of DSL, satellite and Cable Modems, the now ubiquitous 56.5 Kbps dial-up modems, and the advent of the 802.11(a), (b), and (g) standards, commonly known as "wi-fi," Internet connectivity among computer users is now the norm. The speed of data send and receive rates is such that rapid text, audio and video communications is now possible. The availability of such speed and connectivity has ushered in an era where the Internet is used in the vast majority of businesses and homes. Popular communications applications supported by the Internet and available on the web are chat rooms and instant messaging. Chat rooms can be provided by Internet Service Providers (ISPs) such as, for example, AOL/Time Warner or The Microsoft Network, or individual websites. A chat room is essentially an electronic bulletin board where "posts" or messages (e.g., a few lines of text containing a thought or two) are readable to anyone in the chat room in essentially real time. Thus, in a chat room, participants interested in a particular topic (often reflected in the name of the chat room) can electronically "chat" with other chat participants by sending and receiving text messages. In many instances, participants in chat rooms use anonymous screen names which often do not reflect their true identities, ages or level of maturity.

As result of this inherent anonymity, chat rooms can be misused for inappropriate discussions. For example, a child may obtain access to a chat room (e.g., by using a screen name not indicative of the child's age) and seek to either engage in or be approached to engage in "chats" directed to inappropriate subjects, such as sex or drugs. Further, children may access certain chat rooms and, based on chats conducted therein, be lured to take some action outside of the chat room, such as meeting a particular individual. Since such a circumstance may present a significant danger to the child, his or her activity as a chat participant also involves a certain degree of risk and danger.

To address these risks, systems for monitoring the on-line behavior of chat participants have been developed. Nonetheless, these conventional systems have limited abilities, if any, to dynamically interact with chat participants and proactively identify potentially dangerous situations and provide reports of problematic behavior. Some conventional systems, such as, for example, Net Nanny, CYBERsitter, Child Safe and others, scan for occurrences of a list of keywords hopefully indicative of malicious intentions. However this approach has a very limited effectiveness inasmuch as people often shrewdly avoid obvious "bad" keywords. Such conventional systems focus on identifying particular keywords and cannot discern patterns in a conversation that could indicate inappropriate behavior where the use of a particular keyword is absent. In addition, an approach that merely logs the text of chats cannot provide any real-time interaction with a chat participant (for example, either a suspected predator or his victim) or provide for any automatic real-time notification of a designated party (for example a parent or proper authorities). Further, any actions taken based upon a delayed analysis of a chat log can often be too late.

What is desirable in the art is to have a system and/or method for monitoring the actions of particular chat room participants, such as children, to protect them from inappropriate interactions in a chat room. It is further desirable to have a system and/or method that can, once recognizing inappropriate interactions, provide (automatically) a warning to a chat participant and/or to a designated third party, such as a parent, guardian or administrator of the chat room.

SUMMARY OF THE INVENTION

A method and system for on-line monitoring of Internet communications include automatically monitoring text-based communications of one or more chat room or instant messaging participants to determine if a monitoring event has occurred. A monitoring event can be, for example, the combined existence of certain defined factors associated with a particular exchange relating to, for example, the exchange's participants, content, recent history, and/or tone. The existence of a monitoring event can result in one or more predetermined actions being taken by the system.

In an exemplary embodiment of the present invention, on-line communications are continually monitored and input to a number of pattern recognizing modules, preferably working in parallel. Using known pattern-recognition techniques, each pattern recognizing module can analyze an aspect of such communications by implementing certain algorithms and, as appropriate, set, increase or decrease the values of one or more state variables descriptive of one or more defined attributes of the online communications. Such state variables can reflect, for example, emotional levels, participant turnover frequencies, use of suspicious word patterns, and other metrics regarding the on-line communications. State variables output from the various pattern recognizing modules can be simultaneously input to a decision module which can launch one or more decision algorithms. The decision module can then output one or more predetermined actions as determined by the decision algorithms.

DETAILED DESCRIPTION OF THE INVENTION

Figure 1:
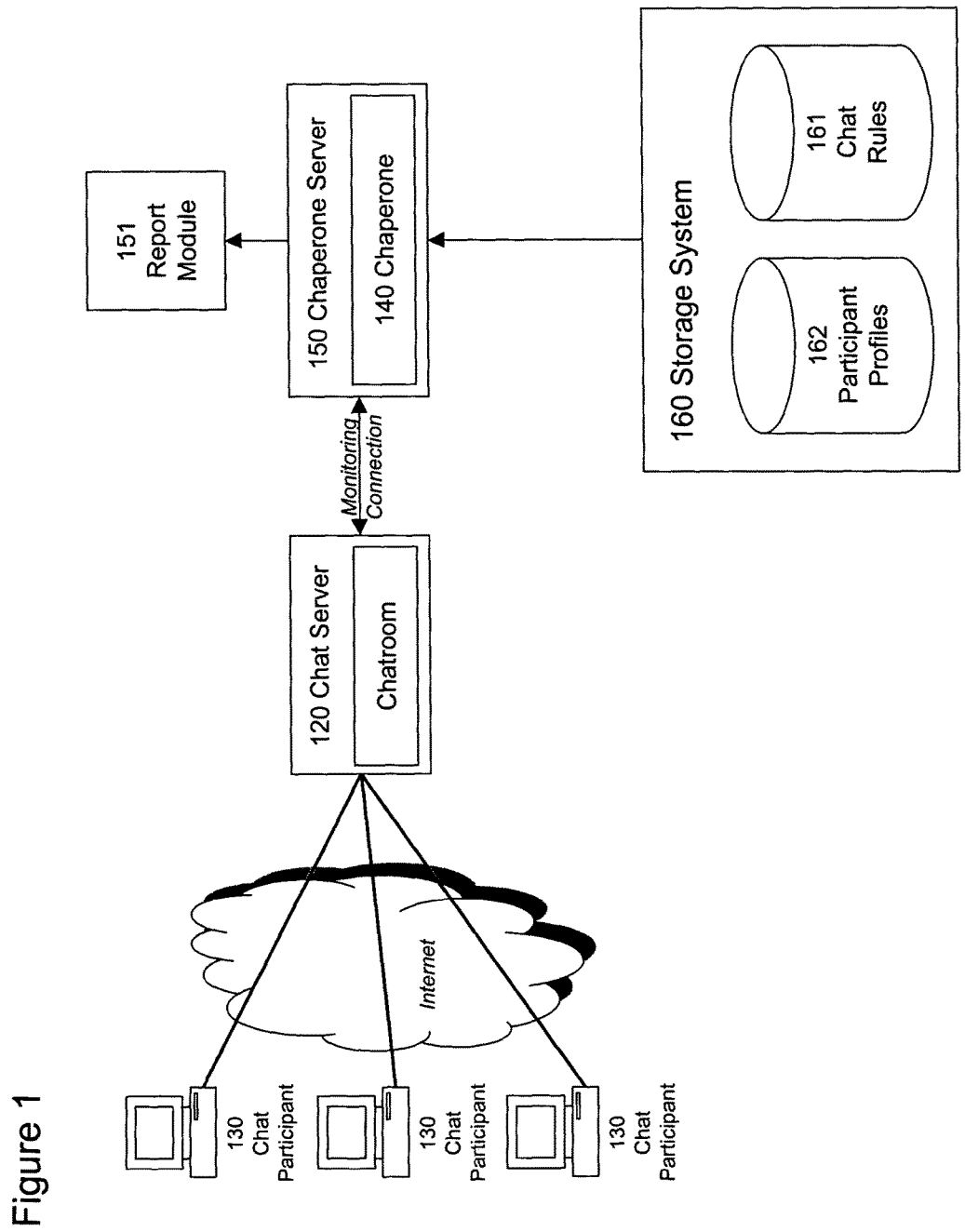
FIG. 1 illustrates an exemplary system for on-line monitoring of a chat according to an embodiment of the present invention.

The present invention relates to a method and system for on-line monitoring of electronic (e.g., Internet) communications. More particularly, the present invention relates to the use of a "Chaperone" to automatically monitor text-based communications of one or more chat room or instant messaging participants to determine if a monitoring event has occurred. A monitoring event can be, for example, the existence of any of a variety of factors associated with a particular chat room or instant messaging exchange, the participants in the exchange, and the content, context and/or tone of the communications. The existence of a monitoring event can result in one or more predetermined actions being taken by the system, such as notification of a third party regarding the monitoring event or termination of the electronic communication.

In an exemplary embodiment of the present invention, on-line communications are continually monitored and input to a number of pattern recognizing modules working in parallel. Each pattern recognizing module can analyze one or more aspect of communications by implementing certain algorithms and, as appropriate, set, increase or decrease the values of one or more state variables descriptive of one or more defined attributes of the online communications. Such state variables can reflect, for example, emotional levels, participant turnover frequencies, use of suspicious word patterns, and other metrics regarding the on-line communications. State variables output from the various pattern recognizing modules can be simultaneously input to a decision module which can launch one or more decision algorithms. The decision module can then output one or more predetermined actions as determined by the decision algorithms.

For ease of illustration of the present invention, an overview of computer communications networks and the on-line communications which they facilitate is described. The described systems and features, while common, are not intended to be exhaustive or limiting.

Online Chat and Instant Messaging

As a result of easy access to the Internet, people have come to rely on it for rapid real-time written communications via, for example, chat room and instant messaging platforms. These platforms are provided by "hosts." Hosts in this context are either ISPs or organizations that have built their own networks to service employees and affiliates and who limit access to said networks to authorized persons. Teenagers and children are particularly active users of chat rooms and instant messaging, and this use is growing at a fast rate.

A common method for users of the Internet to communicate to one or more other users is via text messages in a chat session. In a chat session, a user's name is added to a chat room list so they can then transmit messages to all of the other users then present. Users can also view the messages transmitted by any other member of the chat session.

In a typical chat session, a user sees a single window on screen where messages they are entering as well as those being posted by other participants are visible. The various messages are presented in chronological order within the window. The graphical representations, windows and text images are often called a "room," since the participants interact as if they were in an actual room. The "chat rooms" and all their messages are managed by the Internet Service Provider or other chat room host.

In addition, users can also chose to transmit and read messages to one or more other members in a chat room (or with another user that is not in a particular chat room) but not all participants in the chat room, via a method of interaction called instant messaging ("IM"). IM has been described as "by far the most popular service on the Internet" (http://www.uscomputinginc.com). An instant messaging system is a system whereby a user can transmit and receive messages with another Internet user instantly. There are presently several virtual IM worlds on the Internet, including, for example, Yahoo, MSN and ICQ. Moreover, since there are programs such as Chatterfish (see http://www.uscomputinginc.com) which allow users supported by one IM world to communicate with users in other IM worlds, IM use is ubiquitous and growing. IM is the electronic equivalent of a visual text based telephone, or a "teletext."

In IM, a participant typically sees multiple panes in which only the user's as well as the correspondent messages are displayed in their order of transmission. When a user wishes to IM another user, a window can open that informs a receiving user that someone wishes to exchange messages with them. In this case their identifier, or screen name, can be added to a list of IM participants. For example, in the America Online environment, such a list of IM participants is known as a "buddy list." When any person leaves the IM system, their screen name can disappear from such a buddy list. If someone else wishes to engage in an IM exchange with a user while they are engaged in another IM exchange, this exchange can occur in a separate window. If during a chat session, two members of chat wish to communicate with one another privately from the rest of the chat room, they can do so using IM within the chat room.

Chat rooms and IM worlds, as well as the windows and panes through which one interfaces with them, result from the operation of computers specifically engineered for the task of sorting out where messages originate, and directing them to their intended destination. Collectively, these computers are well known in the art and include standard communication system devices such as routers, servers, and hubs. For technical reasons, the number of participants in a chat room is limited to a certain number of users. If a person attempts to join a session once it is full, they are commonly notified by a system administrator that the session is full and they are precluded from joining the chat. Often such a would-be user is offered to join another chat in progress where the same topic is being discussed. In some "interview" chat sessions, only a moderator and another person are allowed to exchange messages and the other participants are passive observers. In some cases provisions are made so that a user can submit questions in advance for sessions such as these and the moderator queries the interviewee who then answers.

The chat room and IM systems described above are for illustrative purposes, and are understood to present a basic description of common implementations. Numerous variations on these exemplary features and interfaces are possible, and the method and system of the present invention are understood to be capable of implementation in essentially any chat room or IM implementation. Thus, while much of the description in what follows is in terms of chat or chat rooms and participants therein, the term chat is to be understood in the broadest sense, including IM participation and other on-line communications.

Given a computer communications application, such as, for example, a chat room or IM, the various communications effected thereunder can be monitored and controlled according to various embodiments of the present invention, as next described. While various exemplary embodiments described contemplate monitoring chat room communications, these are wholly exemplary. The same principles and functionalities are understood to apply to monitoring IM communications in alternate embodiments of the present invention.

An Automated Chaperone

FIG. 1 illustrates an exemplary system for the on-line monitoring of a chat according to an embodiment of the present invention. As shown in FIG. 1, an ISP or other entity provides access to a chat room 110 hosted by chat server 120, as is known in the art. Chat server 120 can be accessed by chat participants 130. Chat participants are usually subscribers of an ISP or authorized users at a dedicated website. A particular chat in a chat room can be accessed in a conventional manner, such as, for example, by a chat participant 130 logging in to their ISP (e.g., by providing a username and password) and entering a particular chat room hosted by chat server 120. Once in the chat room 110, chat participant 130 can, for example, engage in a chat with another chat participant 130, merely monitor (i.e., read) chats occurring between other chat participants 130, or do any combination of the two activities.

According to an exemplary embodiment of the present invention, once a chat participant 130 enters a chat room, a chat monitoring process can be automatically initiated. For example, chat monitoring can be selected as an auto-initiate feature each time a chat participant logs into his ISP. For example, a parent could activating this feature for a child's account. If desired, initialization and launching of monitoring can be, for example, transparent to a given chat participant 130. This may be particularly desirable for parents or guardians desiring to monitor spontaneous behavior of children on the Internet and in chat rooms.

The on-line monitoring process according to exemplary embodiments of the present invention, sometimes referred to herein as a "Chaperone," can be carried out using a Chaperone 140 hosted by, for example, a Chaperone server 150 which can be part of or co-located with an ISP or other provider of the communications system used by the chat participant 130. In alternative exemplary embodiments of the present invention, Chaperone 140 could be, for example, stored on and run from a chat participant's 130 computer, or stored as an applet and run through a chat participant's 130 web browser.

Running on a server that is part of the ISP or communication system infrastructure, Chaperone 140 could service a community of people such as, for example, subscribers of America Online. Thus, Chaperone 140 could see a more complete view of what is occurring online, as well as have access to the web browsing history and actual information (age, sex, address, etc.) of any chat participants whose behavior becomes suspect. Running on a client's machine, Chaperone 140 could only service the user whose machine is running the system.

Chaperone 140 operating as described herein can be readily implemented in software code, dedicated hardware and/or some combination of hardware and software, to accomplish the chat monitoring tasks without further intervention once the process is initiated or triggered. Additionally, a Chaperone's functionalities implemented in software could be distributed across a variety of computers or other data processors, each running one or more software modules.

An advantage of running the Chaperone 140 on a server that is part of the ISP or communications system infrastructure is that it makes it difficult for a protected chat participant, such as, for example, a child, or anyone else, to override the system. In addition, since the Chaperone 140 can initialize when a protected participant logs in to their ISP account from anywhere, it not only can monitor, detect and report in real time, but can also update its database, i.e., it can "learn" in real time, as described more fully below. Hence, Chaperone 140 it is not a passive bit of code containing certain AI modules that reside on a client that are only updated when the someone purchases a new release; the Chaperone is a smart, dynamically updatable system. Additionally, because it can reside on a server, the Chaperone 140 can send questionable interactions which are discovered to other analytical modules that can work on a latent basis to uncover more detail. Thus, an exemplary system is not tied to one approach, such as, for example, Natural Language Processing (NLP) vs. Bayesian Filtering, or Neural Networks vs. Non-Negative Sampling.

In an exemplary embodiment of the present invention, Chaperone 140 can include artificial intelligence (AI) capabilities, including pattern recognition and decision making capabilities. Such capabilities can, for example, allow the Chaperone 140 to (i) recognize certain predefined and configured types of chat behavior (such as, for example, specifically inappropriate content or conversations with multiple chat room members in quick succession), and to (ii) then decide to act upon such recognized behavior to, for example, (a) interrupt the chat, (b) inform chat participant(s) of recognized violations of defined chat room rules of conduct, and/or (c) inform a third party (such as, for example, a child's guardian or ISP), based on certain predefined recognition algorithms and decision rules. Such algorithms and rules can take as inputs the content and context of the actual chat. Further, the inputs can include, for example, a known history of a violator, a web-browsing history of a participant, personal data for one or more chat participants and/or other information provided to the Chaperone system as may be indicative of improper behavior or relevant to its recognition.

Chaperone 140, or any functional module thereof, can be written in, for example, JAVA code or other suitable programming languages, such as, for example, LISP, PROLOG or SMALLTALK, using conventional techniques as are known in the art.

Details of how a Chaperone 140 accesses on-line communications and performs various analyses, decisions based on those analyses and actions taken as a result of those decisions are described more fully below with reference to FIG. 2 and in the description of implementation of pattern recognizers and decision systems.

Continuing with reference to FIG. 1, Chaperone 140 can, for example, interact with a storage system 160, such as, for example, a direct access storage device, that can contain profile information 162 for chat participants 130 as well as chat rules 161 which can be used to monitor and evaluate chat conversations. Accordingly, storage system 160 can store a number of different databases which are useful in an exemplary embodiment of the present invention. For example, storage system 160 can include a chat rules database 161 containing predetermined rules used by Chaperone 140 to evaluate parsed text from a chat. The predetermined rules can include keywords or key phrases, the use of which by or to chat participants can qualify as a chat rule violation.

In addition to keyword searching, in an exemplary embodiment of the present invention Chaperone 140 can employ a set of known pattern recognition techniques to generate multiple predictions of the intention of a chat room participant. The pattern recognition technology can operate on, for example, the content of a chat message, a conversation's textual history, other non-textual information such as previous conversation participants, the amount of time a person is in a chat room, and a participant's prior history of violations. Such known pattern recognition techniques can include, for example, Natural Language Processing (NLQ and NLP), Bayesian Filtering, Neural Networks or other statistical and analytical techniques.

In an exemplary embodiment of the present invention, these multiple pattern recognition techniques can be employed simultaneously, processing in parallel, and their results can all be input to a decision making module of the Chaperone 140 which can weigh them differently and make decisions, for example, as to whether a violation has occurred or a suspicious situation is occurring. In such an exemplary embodiment, the multiple predictions can be made in real time, such that actions can be interactively taken with chat participants. For example, Chaperone 140 can warn a participant to cease a particular behavior, inform authorities, or block all communications of a particular chat participant or an entire chat room.

Further, using known AI techniques, Chaperone 140 can learn behavior patterns that can be used as indicators of certain chat room behavior rule violations based on, for example, a correlation of indicated behavior patterns and specific known chat room behavior rule violations. One example of such learning could be the ability to discern that a particular set of words indicates a chat room violation even though the word pattern itself, without context, has a non-descript meaning. That is, the word pattern itself would not indicate a behavior rule violation absent the context of the larger conversation encompassing the word pattern. This could, for example, catch circumlocutions which may be utilized by chat participants shrewd enough to "fly under the radar" and continually change their vocabulary, but not their intent or meaning.

Alternatively, detection of possible "code words" can be sent in a report generated by Chaperone 140 to a designated party to determine if the "code word" or phrase should be included in a new chat rule. If so, the chat participant's profile and the chat rules database can be appropriately updated. Accordingly, using known AI techniques, Chaperone 140 can learn certain text behavior patterns of certain chat participants and use this learned behavior information to evaluate subsequent chat text. This learned behavior also can be used to dynamically update existing chat rules or create new chat rules. In this manner, for example, the use of code words could be ascertained even though such code words themselves would not trigger a keyword or phrase filter in the chat rules database absent the behavior learned Chaperone 140.

Storage system 160 also can, for example, store participant profiles 162. Participant profiles 162 can store data on a chat participant 130 who is being protected by the method and system of the present invention.

For example, using a suitable user interface to Chaperone 140, a profile for a protected chat participant can be established, thereby allowing criteria for allowed and prohibited behavior to be established (e.g., setting the age, sex, prohibited topics, prohibited keywords, prohibited screen names or other prohibited criteria). These criteria can interact with the chat rules to determine which chat rules are violated by on-line activity of the protected chat participant 130. Participant profiles 162 also can store data about other chat participants 130 who interact with a given chat participant who is subject to monitoring in accordance with an exemplary embodiment of the present invention. For example, individuals (e.g., other chat participants) that interact with a chat participant 130 being monitored by Chaperone 140 can be added to participant profiles 162 (a profile being created in the first instance of interaction with a new chat participant) so that subsequent chats can use and update all of the profiles monitored by Chaperone 140. In this manner, it also may be possible to identify a chat participant 130 that has changed screen names but exhibits the same characteristics in their typed text which are stored in participant profiles 162 under a different screen name. In such a case, a warning could be provided alerting the protected chat participant 130 or other designated party of the suspended identity and problems associated with the other chat participant.

In an exemplary embodiment of the present invention, storage system 160 could also store a chat log database which records all text of monitored chat. Since such a chat log database could accumulate a significant amount of data, further backup storage could be used in conjunction with it to store historical data on a less expensive format (e.g., tape backup, optical disc arrays, etc.).

In an exemplary embodiment of the present invention, Chaperone server 150 also can include a report module 151, stored, for example, in a memory, or as a database in storage system 160. Report module 151 can create reports based on chat rule violations for transmission to a chat participant 130 and/or designated third parties. Designated third parties can include, for example, a parent or legal guardian of a chat participant 130, or an administrator of the chat room where a chat rule violation occurs. Using known technologies, report module 151 can prepare reports for transmission using, for example, e-mail communications, voice mail communications, pager communications or hard copy report to be sent via postal delivery or overnight delivery.

Figure 2:
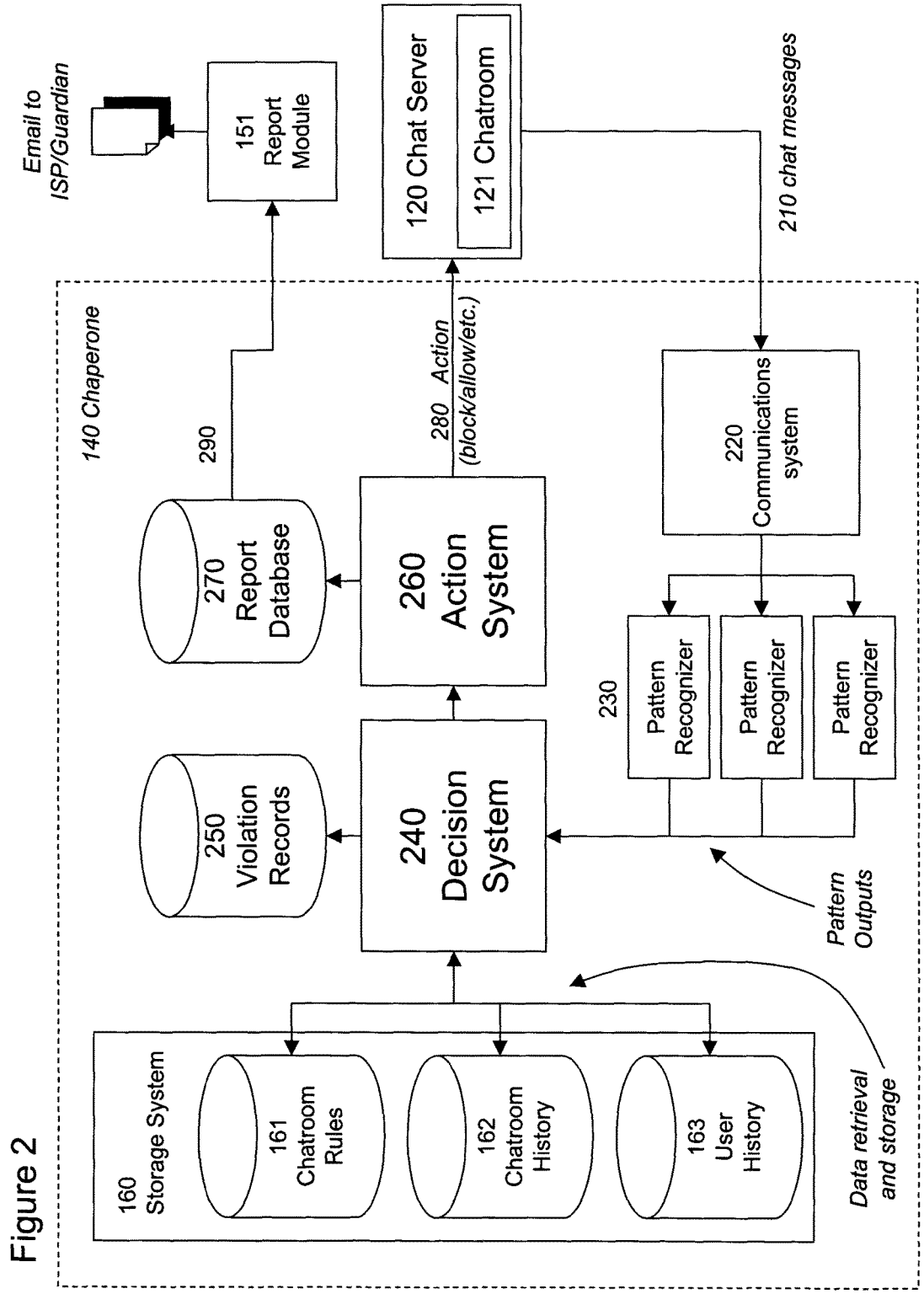
FIG. 2 illustrates an exemplary process for on-line monitoring of a chat according to an embodiment of the present invention.

FIG. 2 illustrates an exemplary process for on-line monitoring of a chat according to an embodiment of the present invention. The process of FIG. 2 depicts exemplary modules or components of the Chaperone 140 depicted in FIG. 1. At 210, the chaperone process in initiated, as described above. At 220, the Chaperone 140 receives a copy of each communication to or from a particular chat participant or among other chat participants or all chat participants in a chat room 121. For example, a copy of all text communications to and from a chat participant can be received by Chaperone 140. The text could be provided to the Chaperone 140 as a continuous stream of data sent to chat server 120 or the chat participant's computer and then buffered for further processing by Chaperone 140 using any conventional transmission and buffering method known in the art.

The text is parsed using a number of pattern recognizers 230 processing in parallel using, for example, pattern recognition software techniques as are known in the art, including, for example, keyword searching, natural language query (NLQ) searching and/or natural language processing (NLP) searching. According to an exemplary embodiment of the present invention, pattern recognizers 230 can search the parsed text for particular keywords (e.g., inappropriate words or phrases) as well as use AI methods to identify patterns in the text via conventional NLQ and NLP processes to discern patterns in the text that violate chat rules. For example, communications system 220 can receive a portion of the communication to or from a chat participant and using NLP processing, parse the portion of the communication so that the communication can be formatted for further processing using NLQ techniques. Known NLQ techniques can be applied to the parsed communication by pattern recognizers 230 to determine if the communication violates any rules stored in a rules database, such as, for example, a prohibition on soliciting child pornography.

Decision system 240 can determine, for example, if the corpus of discovered contextual information produced by pattern recognizers 230 indicates that a rule defined in chatroom rules 161 (stored, for example, in storage system 160, as described above) has been violated, using decision making techniques as are known in the art, and as are described in detail below. If the analyzed chat text is deemed to violate one or more defined chat room rules of conduct, a record can be created indicating that a chat rule violation has occurred and stored in a Violation Records 250 database.

Decision System 240 evaluates the output of the pattern recognizers 230, including any chat rule violations, to determine action(s) to be taken. In an exemplary embodiment of the present invention, decision system 240 can contain decision rules which specify certain actions to be taken as a function of analysis performed by pattern recognizers 230. Such analysis can be, for example, quantified in state variables set and modified by the pattern recognizers, where such decision rules specify outputs as a function of the values of state variables.

Actions decided upon by decision system 240 can be implemented by action system 260, via its interface 280 with chat server 120. For example, based on a particular chat rule violation, filters controlled by the Chaperone can immediately be updated (e.g., to block certain types of information), particular communications to or from a chat participant can be blocked, a chat participant can be contacted with a warning or instruction, or the Chaperone can immediately interrupt the chat. Via report database 270 the Chaperone can create a report of a chat rule violation, which can be transmitted, via interface 290, outside the internal Chaperone environment to report module 151. Report module 151, acting as a "report server" of all reports generated by the Chaperone 140, can then distribute to an affected chat participant and/or a designated third party via, for example, e-mail, voice mail, pager or hard copy, a report using, for example, wireless, wireline, optical or other suitable communication means. For example, using a conventional report generator, a chat rule violation can be formatted into a text or voice message and queued for transmission out of the Chaperone 140.

It is noted that the exemplary modules or components of the Chaperone depicted in FIG. 2 are logical, and are organized as shown solely for purposes of illustration, the depicted system not being intended to restrict the configuration of a particular Chaperone in a given exemplary embodiment of the present invention. Modules or components can be expanded, distributed, and reconfigured according to design needs and specifications.

Thus, in exemplary embodiments of the present invention, storage system 160, for example, can be distributed, with specialized databases being associated with other components. For example, a given pattern recognizer 230 may search for a certain pattern of conversation indicative of an adult soliciting a child to meet him outside the chat room. Thus a specialized sexual predator synonyms database can be associated with a pattern recognizer designed to identify this type of behavior. For example, as is known in the art, while the basic approach of such a sexual predator does not change, the vocabulary used by children (and thus the terms which a sexual predator would use to present an online persona of a peer of his intended victim) may change, with, for example, geographical area, social milieu, and age group.

As a result, in an exemplary embodiment of the present invention, a pattern recognizer 230 could look for a specific conversational pattern which is independent of such vocabulary, using generic key terms that are not used in the jargon or "lingo" of most chat rooms, and, as above, a synonyms table could be stored in a database associated with the pattern recognizer. The online conversational text input to the pattern recognizer 230 could be first "translated," via the synonyms table, from the colloquial terminology of the relevant locale and cultural milieu to the generic terminology used by the pattern recognizer, thus eliminating the need for the pattern recognizer 230 to search for various colloquial "code-terms" each time it is launched. Such functionality would allow pattern recognizer 230 to be optimized for real-time decision making.

Additionally, there can be a number of iterations or feedback loops between pattern recognizers 230, decision system 240 and communications system 220 in a given processing thread prior to a final decision being reached by decision system 240 which results in an action being implemented by action system 260. Thus, decision system 240 may contain rules which take as inputs not only the outputs of pattern recognizers 230, but also the conclusions of other rules contained in decision system 240. Additionally, certain decision rules may call for some operation on or further analysis of original input text from communications system 220 and then a re-inputting of the transformed or operated upon text into a pattern recognizer 230 for further analysis. To support such an exemplary iterative rule, input text from on-line communications 220 could be buffered and intermediate versions thereof (as a result of initial processing by pattern recognizers 230) stored for use as inputs to decision rules or to other pattern recognizers 230 (for another processing iteration), if desired. Implementing such a requirement, in exemplary embodiments of the present invention, a memory or other storage device can be associated with communications system 220 to buffer and store input text and any intermediate versions of it. Further, if enough decision rules require iteration of preliminary results through multiple decision rule layers, decision system 240 can itself be distributed, and separated into preliminary and final decision systems, one calculating intermediate results based on inputs from multiple pattern recognizers, and the other including those intermediate results and the results of the first stage of decision rules in inputs to "final" decision rules.

How pattern recognizers, and the decision modules which act on the basis of such pattern recognizers' output, are implemented and optimized is next described.

Pattern Recognizer Implementation

In an exemplary Chaperone system according to an embodiment of the present invention, a pattern recognizer 230 can implement a general type of analytic method for finding patterns in an online conversation. There can be multiple inputs available for each pattern recognizer 230, but each pattern recognizer should take at least one input: the chat message to be processed. Additionally, pattern recognizers 230 may also take as inputs (i) historical information from the conversation (such as, for example, the last ten messages posted), (ii) historical information about the members of a conversation (such as, for example, a person's prior history of specific chat rule violations), and (iii) conversation state information updated during previous cycles of the Chaperone (a cycle is defined as a single message's processing through the Chaperone 140, where multiple cycles may occur simultaneously). As an output, a pattern recognizer 230 can, for example, set some number of state variables specific to each conversation that are defined locally within the pattern recognizer or globally within the Chaperone 140. These state variables are made available to the decision system 240 of the Chaperone 140, as well as to later cycles of the Chaperone 140 for use as inputs to a pattern recognizer 230. The state variables are essentially summaries of information found by each PR.

For example, a pattern recognizer 230 may implement a generic word finder which uses a stored dictionary of words. The key-word-recognizer then processes one message per cycle, and sets the state variable for that message to indicate how many key-words it has found. The key-word-recognizer also can indicate which words it has found, and other information relating to those words that is stored within its dictionary of words.

A Natural Language Parser may also be implemented as a pattern recognizer 230. An objective of such an NLP can be to implement phrase recognition, word sense disambiguation, or grammatical function assignment. Such a parser, as per the method outlined by Brill in 1992 in *A Simple Rule-Based Part Of Speech Tagger* (1992), a paper published in the Proceedings of the Third Conference on Applied Natural Language Processing, tags speech using rules-based methods. The NLP-recognizer also may make use of stochastic taggers. Such taggers can use methods such as, for example, those outlined by Cutting, Kupicec, Pederson, and Sibun of Xerox PARC in *A Practical Part-of-Speech Tagger* (1992) also published in the Proceedings of the Third Conference on Applied Natural Language Processing which uses a speech tagger based on hidden Markov models, and other stochastic analytical methods. The NLP-recognizer sets state variables that indicate the subject, object, and action of a particular phrase or sentence, setting these variables to the base forms of those words (for example, the past-tense verb "fixed" will be indicated as the action "to fix").

Both of these methods are robust, and possess minimal resource requirements. Thus, the exchanges (on-line conversations) can be analyzed in "real time," facilitating the Chaperone's dynamic interaction with chat participants, parents, authorities, ISP or chat administrators, etc. Each method can be deployed based on the rules and requirements of the specific chat server being monitored. In order to achieve an accuracy that exceeds 95%, implementation strategies and optimizations can be deployed in order to obtain high-speed operation. Details for implementing such strategies can be found in the Brill and Kupicec, et al. references cited above, which are hereby incorporated by reference.

The outputs of the pattern recognizers 230 can then be input into a neural network asynchronously from the real time processing. Such a neural network can, for example, utilize Continuous Nonnegative Data Sampling methods. An example of such a technique can be found in Olly Downs, *Learning Models for Continuous Nonnegative Data*, Slides from General Exam Presentation (Princeton University, Apr. 18, 2000), available on-line at http://www.princeton.edu/~obdowns/generalexam.pdf. Accordingly, a neural network can learn and adapt its pattern recognition capabilities based upon the information detected by a pattern recognizer 230, and provide additional inputs into pattern recognizers 230 or modify the algorithm used by pattern recognizers 230. During later cycles of operation, pattern recognizer 230 can be able to detect new types of information such as slang, code words, and shifts in the behavioral patterns of members of the chat room based on the updated information provided by the neural network.

Depending on the requirements of the installation of a given Chaperone system, a particular pattern recognizer 230 may be disabled to provide faster processing. Pattern recognizer 230 can also be installed on a set of distributed servers (i.e., such that one or more computers run one or more pattern recognizer 230, but no other components of the Chaperone), and can provide their output to another server that maintains the conversation state for processing by the Chaperone's decision system. Multiple instances of each pattern recognizer 230 may also be configured to allow for parallel processing of incoming messages. For example, each pattern recognizer may be able to process some number of messages in parallel, so multiple instances of that pattern recognizer will multiply the number of messages that can be processed by a single instance of that pattern recognizer.

In an exemplary embodiment of the present invention, the settings of an individual pattern recognizer 230 can be customized based on the installation of a Chaperone system. For example, a key-word-recognizer can use a dictionary customized for a specific lexicon, such as teen slang or financial information. Similarly, the NLP-recognizer can be configured with domain specific knowledge as noted above, so that it can understand the sentence structure and word usage for a specific domain (such as teenagers, a bank, music file sharing).

In exemplary embodiments of the present invention, a Chaperone also may include a special pattern recognizer that operates before all other pattern recognizer to provide conversation separation. Such a pattern recognizer could, for example, indicate which conversation a particular incoming message belonged to, so that later processing by other pattern recognizers (such as a behavior recognizer) can use this information as input. Such a conversation recognizer is useful especially in chat rooms where multiple conversations can occur simultaneously, and the individual messages of each conversation are interspersed. An example of such a conversation recognizer is described in the published Masters Thesis "*Coterie: A Visualization of the Conversational Dynamics Within IRC*" by Dana Spiegel, 2001, Massachusetts Institute of Technology ("Coterie") which is hereby incorporated by reference. An exemplary conversation recognizer as used in an exemplary embodiment of the present invention can operate in similar fashion to the one described in Coterie, setting a state variable for each message indicating to which conversation that message belonged.

An exemplary Chaperone 140 also may include a behavior recognizer similar to the one documented in Coterie. Such a behavior-recognizer could recognize certain predetermined conversational behaviors within a chat room. For example, if a chat room member has multiple conversations with each member of a chat room in a one-on-one fashion, and these conversations are each brief, then the exemplary behavior recognizer can indicate that the member in question exhibits a "round-robin behavior." This behavior state can then be used by a decision system as an input to various decision rules. Specific behaviors that a behavior-recognizer can know about and seek to recognize are determined generally by research on and interviews with informed parties (such as, for example, law enforcement officials, teenagers, and sociologists).

Other pattern recognizers 230 may include the following operations in exemplary embodiments of the present invention. Implementations of such AI algorithms are commonly known in the art.

Bayesian filter: Uses the last several lines of text to calculate the score (probability) based on a previously established database of good and malicious conversations.

The calculation is based on Bayes' rule, as is known in the art. A cogent description of Bayesian filtering can be found at http://www.paulgraham.com/spam.html.

Neural-network filter: Uses the last several lines of text to calculate the score (probability) based on a neural network. The weights of the network (strengths of the synapses between neurons in the neural network) will be trained in a separate (nightly) phase using a large database of good and malicious conversations, similar to the Bayesian algorithm. During online operation, the trained network simply outputs a number based on the current weights and the text input.

Emotion filter: Determines the level of emotional content (e.g., intensity, agitation, anger, giddiness, etc.) of a message (and thus its author) based on word usage and sentence structure. A general implementation of this type of pattern recognition is used in Qualcomm's Eudora email product, detailed at: http://www.eudora.com/presskit/pdf/Flaming_White_Paper.PDF.

Decision System Implementation

As noted above, in exemplary embodiments of the present invention, a Chaperone's decision system ("DS") is a rules based system, as is known in the art. Rules of a DS have clauses that can use as inputs state variables of a message or conversation that are output by a set of pattern recognizers. The role of the DS is to take a set of rules, and evaluate, based on the state information of a conversation or message (along with other inputs such as user history and conversation history) whether any of the defined rules have been violated. Once a rule has been found to be violated a DS can set other state variables which the action system ("AS") can then processes (such as blocking a message), as well as update a set of information used to report such violations.

A DS, for example, can reference the rules designated by an administrator of a server to detect potentially dangerous contacts by strangers. As an example, these rules for an on-line chat room typically ban sexually explicit interactions and solicitation of minors, among other rules. In exemplary embodiments of the present invention, a Chaperone also can reference a database of information about the user it is supervising such as, for example, their age, sex, geographic location, etc. among other factors.

To create a rule, a system administrator can first either collect a set of exemplary conversation text, or conduct manual research (such as interviewing teenagers or law enforcement officials). In the case of using exemplary conversation text, an administrator may run a set of pattern recognizers on an exemplary text corpus manually, and view the state information outputs created by the pattern recognizer. Using the state information, the administrator can then filter inconsequential state information based on, for example, guidelines and experience, and use the useful state information to craft DS rules that implement defined chat room rules. This approach is often referred to by those skilled in the art as the "bottom-up approach" for creating DS rules.

In the case of conducting manual research, an administrator can use information garnered from interviews to build DS rules. For example, a law enforcement official may know that the term "hook up" within the context of male-female relationships is really indicating that one of the two involved parties wishes to have sex with the other. Using this information, in exemplary embodiments of the present invention, a system administrator may craft a rule that says, for example, if a NLP-recognizer finds the term "hook-up" and the conversation in question has two members, then the conversation should be marked as possibly containing solicitous interaction. If such interaction is not allowed in the given chat room, then an administrator's rule may indicate, for example, that the message be blocked, or that the member posting the message be warned. This approach is often referred to by those skilled in the art as the "top-down approach" for creating DS rules.

Using the top-down approach, a DS can detect, for example, a common scenario such as the following. A predator visits chat rooms to find lonely, enthusiastic or otherwise vulnerable children and profile them. Typically, such a predator then moves to private messaging or e-mail in order to gain the child's trust. After this trust has been established, a "real world" meeting is usually arranged which often results in assault and/or injury. Based on a sampling of rules in most chat rooms for children, an example of an interaction that a Chaperone according to an embodiment of the present invention could begin to monitor would be one where a stranger asks a child being supervised by the Chaperone "Have you had sex with your boyfriend?" and ends with one of "Can I get your phone number?," "Will you meet me in the park?" or "What is your private email address?" The Chaperone 140 can determine who is a stranger relative to any protected chat participant by, for example, maintaining a list of all persons a particular user has interacted with in that user's user history. Such a user history can be loaded into, for example, rapid access memory immediately upon a protected user initiating Internet communications, making the user history available to pattern recognizer as an input to their analysis.

Optimizing Rules and Pattern Recognizer for Real-Time Processing

It is well known in the art that semantic sentence analysis is expensive in terms of processing power and time required to resolve the entire meaning of a sentence or paragraph. Chaperone 140 is able to process messages in real time with a semantic analyzer by using special purpose pattern recognizers 230 which significantly reduce the general processing that the pattern recognizer 230 is required to do and by reducing word knowledge that the semantic analyzer is required to use.

Such optimizations result in a semantic analyzer that is specially attuned to one, or at most a few, knowledge domains. The outputs of such a semantic analyzer will only be able to recover some parts of the messages underlying meaning and pass that information on to the Chaperone's Decision System. This is not problematic, since the Decision System is only interested in those certain conversational features that the semantic analyzer is optimized to extract. Working together, the optimized semantic analyzer and the Decision System can process each message fast enough to maintain the real-time operation of the Chaperone system. If deeper analysis is required for offline processing of messages, then another, more complex (but slower), semantic analyzer can be run in parallel with the first that contains more general knowledge about sentence structure in chat conversations.

Exemplary Pseudocode

The following is exemplary psuedocode which can be used to partially implement an exemplary embodiment of the present invention. The pseudocode comprises an example of a top level Decision Module which is an exemplary implementation of the logical Decision System 240 and Action System 260 modules of FIG. 2. Additionally, the pseudocode contains two recognizer modules, analogous to the pattern recognizers 230 depicted in FIG. 2. Based on various state variables, the Decision Module can implement various example actions.

Chaperone Rules (240):
Matches sentences where a person is asking about sex
between message receiver and their partner
match (semantic-recognizer: action contains: sex)
match (semantic-recognizer: object contains: partner)
match (semantic-recognizer: subject contains: you)
match (emotion-recognizer: intensity is at least: warm)
set conversation: state to: questionable
Matches a questionable conversation state when a person
asks for a phone number
match (semantic-recognizer: action contains: give)
match (semantic-recognizer: object contains: phone-number)
match (semantic-recognizer: subject contains: you)
match (conversation: state is at least: questionable)
match (behavior-recognizer: type is: one-on-one)
match (emotion-recognizer: intensity is at least: hot)
set conversation: state to: warning
Matches a questionable conversation state when a person
asks to meet
match (semantic-recognizer: action contains: meet)
match (semantic-recognizer: object contains: park)
match (semantic-recognizer: subject contains: you)
match (behavior-recognizer: type is: one-on-one)
match (emotion-recognizer: intensity is at least: hot)
set conversation: state to: alert
Key-Word-Recognizer (230):
for each: word
if: alert-words-list contains: word
then: alert-words-occurances=:alert-words-occurances+1
for each: word
if: warning-words-list contains: word
then: warning-words-occurances=:warning-words-occurances+1
Behavior-Recognizer (230):
if
  ((last-message: to does not equal current-message: to) AND
  (last-message: time<3 seconds ago) AND
  (conversations: number (within 5 minutes)>5))
then
  round-robin-behavior: confidence=70%

As can be seen from the exemplary pseudocode, the Chaperone Rules module includes three matching modules, each of which is designed to match a portion of an interaction which is suspect. In fact, the pseudocode implements the example described above in connection with the top-down approach for creating decision system rules. As noted above, a common scenario which the decision system is designed to detect is that of a predator visiting an Internet chatroom to find a vulnerable child. An exemplary interaction that a chaperone would want to monitor is one where a stranger asks a child "have you had sex with your boyfriend?" and ends with one of "can I get your phone number?," "will you meet me in the park?," or "what is your private e-mail address?".

As can be seen from three modules of decision system Chaperone Rules in the pseudocode, the first module matches the opening question, i.e., whether the chatroom participant had sex with their partner. The second module seeks to capture whether the other person is asking the protected participant for a phone number. The third module is seeking to capture whether the other person asks the protected participant to meet. The matching is done through, for example, a series of tests involving output of a semantic pattern recognizer called "Semantic-recognizer." Semantic-recognizer is a pattern recognizer which implements a semantic analysis against input text, and assigns values form the input text to semantic variables "action" "object" and "subject." Those variables are then used by the three matching modules of decision system Chaperone Rules to determine whether the text is reflective of the potential sexual predator scenario outlined above.

The three modules of Chaperone Rules in the pseudocode can also make use of Emotion-recognizer, a pattern recognizer whose code is not provided. Emotion-recognizer is a type of pattern recognizer that seeks to discover the emotional content of on-line communication, and its outputs can be, for example, the emotional variable "intensity" whose possible values include, for example, "warm," "hot" and "cold."

Given these inputs, the first module of Chaperone Rules looks for matches of the semantic variables "action," "object" and "subject" with the values "sex," "you" and "partner," respectively. If the values of the semantic variables extracted by Semantic-recognizer are found to match these values, the first module of Chaperone Rules can test whether Emotion-recognizer has set the emotion variable "intensity" to a value of at least "warm." If that is also true, the decision module sets a conversation variable "state" to the value of "questionable."

In a similar fashion, the second module of Chaperone Rules looks for a match between the semantic variables "action," "object," and "subject," respectively, with the values "given," "phone-number" and "you." If those semantic values are, in fact, matched, the second module of Chaperone Rules tests whether the conversation value "state" is at least "questionable." If that is true, the module tests whether the behavior variable "type" is "one-on-one." If that is true, the module finally tests whether the emotion value "intensity" is at least "hot." If all of those matches are true, Chaperone Rules sets a conversation value of "state" to "warning."

It is noted that the conversation value "state" was set to "questionable" by the first module, which detected the characteristic opening line "did you have sex with your partner" of a potential sexual predator as described above. Once the opening line was detected, the second and third modules can test for the follow-up stages where the sexual predator requests a telephone number, and then, if successful (which, as described above, indicates that the victim has begun to trust the sexual predator), the victim is finally asked to meet the sexual predator. This situation is dealt with in the third module of Chaperone Rules. Further, Chaperone Rules uses the output of a pattern recognizer "Behavior-recognizer" to tell it the value of a behavioral variable "type."

In the third module Chaperone Rules seeks to capture the situation where the sexual predator asks for a meeting from the protected on-line participant. This is effected by matching the three semantic variables of "action," "object," and "subject" with the test values "meet," "park" and "you," respectively. It is noted that the pattern recognizer Semantic-recognizer will extract these key semantic components from whatever the actual language was. In addition, as described above, a separate synonyms database could be associated with pattern recognizer Semantic-recognizer, which could translate whatever colloquial terms are actually used for the various semantic variable values that Chaperone Rules is attempting to match.

Returning to the third module of Chaperone Rules, once the values of the three semantic values which detect a requested meeting have been matched, the program once again tests whether the behavior variable "type" still has the value "one-on-one." If that is the case, the program finally tests if the emotion content of the exchange has increased. That is done by testing whether the emotion variable "intensity" has the value of at least "hot". If that is the case, the decision system sets the conversation variable "state" to "alert." While there is no pseudocode provided for an exemplary action system module 260 of FIG. 2, it should be clear that in an exemplary embodiment of the present invention an action system will take as inputs the conversation variable "state." If it has the values of "warning" or "alert," an action system would take some action such as, for example, warning the protected chat participant, warning an ISP provider, the administration, or the parents of the protected chat participant. If the conversation variable "state" is set to "alert", in exemplary embodiments of the present invention an action system 260 could, for example, block all on-line communications between the protected participant and the suspected sexual predator.

The remainder of the pseudocode implements the two pattern recognizers "Key-word-recognizer" and "Behavior recognizer." Beginning with "key-word-recognizer," that pattern recognizer searches each word in an incoming text corpus to see if that word is found on an alert words list. If so, it increments a variable called "alert-words-occurrences." Similar functionality is implemented for a word on a "warning words list."

Finally, Behavior-recognizer seeks to determine whether round-robin behavior, as described above, is occurring in the on-line communications. Round-robin behavior is a situation where somebody is sending messages to a number of different people on-line in a short span of time. To measure this, there is a variable called "last-message: to" which determines who is the addressee of a last on-line communication. If the addressee of a current on-line communication is not the same, i.e., variable "last message: to" does not equal variable "current message: to," then the current recipient of communications is not the same as the last one. If the shift occurred less than three seconds ago, the second line of the code will pick that up by testing whether the "last-message: time" variable, which is the time in seconds at which the last message became the last message, in other words, that there was a shift in addressee, happened less than three seconds ago. If that is true, and there had been more than five conversations within the last five minutes, which is tested for by the code "conversations: number (within 5 minutes)>five," then the pattern recognizer Behavior-recognizer concludes that there is a round-robin behavior confidence level of 70%. I.e., a 0.7 probability that the conversation is of a round-robin type. The state variable "round-robin behavior: confidence" can be used in a number of rules not depicted in the pseudocode for Chaperone Rules. Similarly, the state variables "alert-words-occurrences" and "warning-words-occurrences" are also variables that can be used by other rules at the decision system level, which are not depicted in the pseudocode for brevity of illustration.

Modifications and substitutions by one of ordinary skill in the art are considered to be within the scope of the present invention, which is not to be limited except by the following claims.

What is claimed:

1. A method for monitoring an electronic communication, the method comprising:
   accessing, by a server, a communication from at least one of a chat room participant or an instant messaging ("IM") participant, wherein the communication is via a client;
   analyzing, by the server, a conversational content of the communication using a plurality of artificial intelligence pattern recognition techniques operating in parallel, wherein at least one of the artificial intelligence pattern recognition techniques employs at least one of a natural language parser, a stochastic tagger, a neural network, a knowledge domain specific dictionary, a behavior recognizer, a Bayesian filter, a neural-network filter, or an emotion filter;
   deciding, by the server, whether a monitoring event has occurred based upon a result of the analyzing and a set of predetermined rules, wherein the at least one of the artificial intelligence pattern recognition techniques or the set of predetermined rules is dynamically updated; and
   taking, by the server, a predetermined action in response to the monitoring event, wherein the accessing, the analyzing, the deciding, and the taking are accomplished automatically in response to the accessing.

2. The method of claim 1, wherein the set of predetermined rules is stored in a database.

3. The method of claim 2, wherein the database includes a SQL database.

4. The method of claim 2, wherein the set of predetermined rules include a rule based on an interaction with at least one of the chat room participant or the IM participant.

5. The method of claim 2, wherein the set of predetermined rules includes a rule based on an interaction between a plurality of non-chat room participants in a chat room.

6. The method of claim 1, wherein an action related to the accessing, the analyzing, and the deciding is not displayed to the chat room participant and the IM participant.

7. The method of claim 1, where the predetermined action includes at least one of informing at least one of the chat room participant or the IM participant of a rule violation, informing at least one of the chat room participant or the IM participant of a potentially dangerous situation, reporting a violation to a parent client or a guardian client of at least one of the chat room participant or the IM participant, reporting at least one of a violation or potential violation to an ISP server, or blocking the communication.

8. The method of claim 7, wherein the reporting is accomplished via at least one of a wireless communication, an electronic mail communication, or a voice communication.

9. The method of claim 8, wherein the wireless communication includes at least one of a cellular telephony or a paging system.

10. The method of claim 1, wherein the monitoring event includes at least one of a violation of a chat rule, an occurrence of a conversational content pattern, or an occurrence of a predetermined conversational behavioral pattern.

11. The method of claim 1, wherein the communication includes a wide area network communication.

12. The method of claim 1, wherein the at least one of the artificial intelligence pattern recognition techniques employs at least one of a natural language parser, a stochastic tagger, a neural network, or a knowledge domain specific dictionary.

13. The method of claim 1, wherein the at least one of the artificial intelligence pattern recognition techniques seeks to determine a round-robin behavior of communication.

14. The method of claim 1, wherein the at least one of the artificial intelligence pattern recognition techniques employs at least one of a Bayesian filter, a neural-network filter, or an emotion filter.

15. The method of claim 1, wherein the analyzing is based on parsing the conversational content in accordance with a natural language processing technique and then querying the conversational content in accordance with a natural language query technique.

16. The method of claim 1, wherein the analyzing is in parallel for a plurality of patterns.

17. The method of claim 1, further comprising:
setting, by the server, a value of a state variable descriptive of a defined attribute of the conversational content; and
modifying, by the server, the value based on the analyzing, wherein the deciding is based on the value.

18. The method of claim 1, wherein the at least one of the artificial intelligence pattern recognition techniques employs the natural language parser.

19. The method of claim 1, wherein the at least one of the artificial intelligence pattern recognition techniques employs the stochastic tagger.

20. The method of claim 1, wherein the at least one of the artificial intelligence pattern recognition techniques employs the neural network.

21. The method of claim 1, wherein the at least one of the artificial intelligence pattern recognition techniques employs the knowledge domain specific dictionary.

22. The method of claim 1, wherein the at least one of the artificial intelligence pattern recognition techniques employs the behavior recognizer.

23. The method of claim 1, wherein the at least one of the artificial intelligence pattern recognition techniques employs the Bayesian filter.

24. The method of claim 1, wherein the at least one of the artificial intelligence pattern recognition techniques employs the neural-network filter.

25. The method of claim 1, wherein the at least one of the artificial intelligence pattern recognition techniques employs the emotion filter.

26. The method of claim 1, wherein the communication is from the chat room participant.

27. The method of claim 1, wherein the communication is from the IM participant.

28. The method of claim 1, wherein the at least one of the artificial intelligence pattern recognition techniques is dynamically updated.

29. The method of claim 1, wherein the set of predetermined rules is dynamically updated.

30. A system for monitoring a network communication, the system comprising:
a system bus;
a central processing unit coupled to the system bus;
a memory coupled to the system bus; and
an I/O interface coupled to the system bus;
wherein the memory contains an executable code to be processed by the central processing unit, wherein the executable code causes the central processing unit to:
access a communication from at least one of a chat room participant or an instant messaging participant, where the communication is via a client remote from the central processing unit;
analyze a conversational content of the communication using a plurality of artificial intelligence pattern recognition techniques operating in parallel, wherein at least one of the artificial intelligence pattern recognition techniques employs at least one of a natural language parser, a stochastic tagger, a neural network, a knowledge domain specific dictionary, a behavior recognizer, a Bayesian filter, a neural-network filter, or an emotion filter;
decide whether a monitoring event has occurred based upon a result of the analyzing and a set of predetermined rules, wherein the at least one of the artificial intelligence pattern recognition techniques or the set of predetermined rules is dynamically updated; and
take a predetermined action in response to the monitoring event.

31. The system of claim 30, wherein the system bus, the central processing unit, the memory, and the I/O interface form at least one of a server computer, a desktop computer, or a laptop computer.

32. The system of claim 30, where the memory includes at least one of a read only memory or a random access memory.

33. The system of claim 30, further comprising:
a secondary storage device coupled to the system bus.

34. The system of claim 33, wherein the secondary storage device includes a direct access storage device.

35. The system of claim 30, wherein the memory includes a rules module, a history module, a user history module and a report module.

36. A computer program product comprising a non-transitory computer readable medium having a computer readable program code embodied therein, the computer readable program code in the computer program product comprising a set of instructions for causing a server to automatically:
access a communication from a participant of at least one of a chat room or an instant message session, wherein the communication is via a client;
analyze a conversational content of the communication using a plurality of artificial intelligence pattern recognition techniques operating in parallel, wherein the artificial intelligence pattern recognition techniques include a first artificial intelligence pattern recognition technique and a second artificial intelligence pattern recognition technique, wherein at least one of the first artificial intelligence pattern recognition technique or the second artificial intelligence pattern recognition technique employs at least one of a natural language parser, a stochastic tagger, a neural network, a knowledge domain specific dictionary, a behavior recognizer, a Bayesian filter, a neural-network filter, or an emotion filter;
decide whether a monitoring event has occurred based upon a result of the analyzing and a set of predetermined rules, wherein at least one of the first artificial intelligence pattern recognition technique, the second artificial intelligence pattern recognition technique, or the set of predetermined rules is dynamically updated based on the analyzing; and
take a predetermined action in response to the monitoring event.

37. The computer program product of claim 36, wherein the conversational content is analyzed via the first artificial intelligence pattern recognition technique and the second artificial intelligence pattern recognition technique in parallel.

38. The computer program product of claim 37, wherein the deciding is based on a first output from the first artificial intelligence pattern recognition technique and a second output from the second artificial intelligence pattern recognition technique.

39. A method comprising:
accessing, by a monitoring server, a real-time message sent from a sender client to a receiver client over a messaging server coupled to the monitoring server, wherein the real-time message comprises a user input conversational communication content;
in response to the accessing, in real-time, automatically:
parsing, by the monitoring server, the user input conversational communication content into a plurality of segments;
analyzing, by the monitoring server, at least one of the segments via a plurality of artificial intelligence pattern recognition techniques operating in parallel;
recognizing, by the monitoring server, a pattern in the at least one of the segments via at least one of the artificial intelligence pattern recognition techniques;
deciding, by the monitoring server, whether a monitoring event has occurred based on the analyzing and the recognizing and a dynamically updateable rule stored in a database coupled to the monitoring server; and
taking, by the monitoring server, a predetermined action in response to the deciding, wherein the predetermined action relates to an intervention with respect to at least one of the sender client or the receiver client.

40. The method of claim 39, wherein the recognizing is based on parsing the real-time message in accordance with a natural language processing technique and then querying the real-time message in accordance with a natural language query technique.

41. The method of claim 39, wherein the pattern is a first pattern, and further comprising:
recognizing, by the monitoring server, a second pattern in the at least one of the segments in parallel to recognizing the first pattern in the at least one of the segments.

42. The method of claim 39, further comprising:
setting, by the monitoring server, a value of a state variable descriptive of a defined attribute of the real-time message; and
modifying, by the monitoring server, the value based on the recognizing, wherein the deciding is based on the value.

43. The method of claim 39, wherein the predetermined action relates to the intervention with respect to the sender client.

44. The method of claim 39, wherein the predetermined action relates to the intervention with respect to the receiver client.

45. The method of claim 39, wherein the at least one of the artificial intelligence pattern recognition techniques employs a natural language parser.

46. The method of claim 39, wherein the at least one of the artificial intelligence pattern recognition techniques employs a stochastic tagger.

47. The method of claim 39, wherein the at least one of the artificial intelligence pattern recognition techniques employs a neural network.

48. The method of claim 39, wherein the at least one of the artificial intelligence pattern recognition techniques employs a knowledge domain specific dictionary.

49. The method of claim 39, wherein the at least one of the artificial intelligence pattern recognition techniques employs a behavior recognizer.

50. The method of claim 39, wherein the at least one of the artificial intelligence pattern recognition techniques employs a Bayesian filter.

51. The method of claim 39, wherein the at least one of the artificial intelligence pattern recognition techniques employs a neural-network filter.

52. The method of claim 39, wherein the at least one of the artificial intelligence pattern recognition techniques employs an emotion filter.

53. A method comprising:
accessing, via a server, a communication from at least one of a chat room participant or an instant messaging participant, wherein the communication includes a conversational content, wherein the communication is received from a client, wherein the client is remote from the server;
performing, via the server, an analysis of the conversational content via a plurality of artificial intelligence pattern recognition techniques operating in parallel, wherein at least one of the artificial intelligence pattern recognition techniques employs at least one of a natural language parser, a stochastic tagger, a neural network, a knowledge domain specific dictionary, a behavior recognizer, a Bayesian filter, a neural-network filter, or an emotion filter;
generating, via the server, a result of the analysis;
deciding, via the server, whether a monitoring event has occurred based on the result and a set of predetermined rules, wherein the at least one of the artificial intelligence pattern recognition techniques or the set of predetermined rules is dynamically updateable; and
taking, via the server, a predetermined action responsive to the monitoring event.

54. The method of claim 53, wherein the communication is from the chat room participant.

55. The method of claim 53, wherein the communication is from the instant messaging participant.

56. The method of claim 53, wherein the server is a plurality of distributed servers.

57. The method of claim 53, wherein the client is a mobile wireless client.

58. The method of claim 53, wherein the server is in communication with at least one of a chat program enabling the chat room participant or an instant messaging program enabling the instant messaging participant.

59. The method of claim 53, wherein the client hosts a browser, wherein the communication is received from the browser.

60. The method of claim 53, wherein at least some of the analysis is performed on a latent basis.

61. The method of claim 53, wherein the conversational content includes a text.

62. The method of claim 53, wherein at least two of the artificial intelligence pattern recognition techniques employ at least one of a natural language parser, a stochastic tagger, a neural network, a knowledge domain specific dictionary, a behavior recognizer, a Bayesian filter, a neural-network filter, or an emotion filter.

63. The method of claim 53, wherein at least one of the artificial intelligence pattern recognition techniques employs a natural language parser.

64. The method of claim 53, wherein at least one of the artificial intelligence pattern recognition techniques employs a stochastic tagger.

65. The method of claim 53, wherein at least one of the artificial intelligence pattern recognition techniques employs a neural network.

66. The method of claim 53, wherein at least one of the artificial intelligence pattern recognition techniques employs a knowledge domain specific dictionary.

67. The method of claim 53, wherein at least one of the artificial intelligence pattern recognition techniques employs a behavior recognizer.

68. The method of claim 53, wherein at least one of the artificial intelligence pattern recognition techniques employs a Bayesian filter.

69. The method of claim 53, wherein at least one of the artificial intelligence pattern recognition techniques employs a neural-network filter.

70. The method of claim 53, wherein at least one of the artificial intelligence pattern recognition techniques employs an emotion filter.

71. A method comprising:
    accessing, by a first server, a real-time message sent from a sender client to a receiver client over a second server coupled to the first server, wherein the real-time message comprises a user input conversational communication content;
    based on the real-time message being accessed in real-time:
        parsing, by the first server, the user input conversational communication content into a plurality of segments;
        performing, by the first server, an analysis of at least one of the segments via a plurality of artificial intelligence pattern recognition techniques operating in parallel;
        recognizing, by the first server, a pattern in the at least one of the segments via at least one of the artificial intelligence pattern recognition techniques;
        forming, by the first server, a decision whether a monitoring event has occurred based on the analysis, the pattern, and a dynamically updateable rule stored in a database coupled to the first server; and
        taking, by the first server, a predetermined action responsive to the decision that the monitoring event has occurred, wherein the predetermined action relates to an intervention with respect to at least one of the sender client or the receiver client.

72. The method of claim 71, wherein the sender client and the receiver client are participating in a chat session including the real-time message.

73. The method of claim 71, wherein the sender client and the receiver client are participating in an instant messaging session including the real-time message.

74. The method of claim 71, wherein at least one of the first server or the second server is a plurality of distributed servers.

75. The method of claim 71, wherein at least one of the sender client or the receiver client is a mobile wireless client.

76. The method of claim 71, wherein the second server is at least one of a chat server or an instant messaging server.

77. The method of claim 71, wherein the sender client hosts a browser, wherein the real-time message is received from the browser.

78. The method of claim 71, wherein at least some of the analysis is performed on a latent basis.

79. The method of claim 71, wherein the real-time message includes a text.

80. The method of claim 71, wherein at least one of the artificial intelligence pattern recognition techniques employ at least one of a natural language parser, a stochastic tagger, a neural network, a knowledge domain specific dictionary, a behavior recognizer, a Bayesian filter, a neural-network filter, or an emotion filter.

81. The method of claim 71, wherein at least one of the artificial intelligence pattern recognition techniques employs a natural language parser.

82. The method of claim 71, wherein at least one of the artificial intelligence pattern recognition techniques employs a stochastic tagger.

83. The method of claim 71, wherein at least one of the artificial intelligence pattern recognition techniques employs a neural network.

84. The method of claim 71, wherein at least one of the artificial intelligence pattern recognition techniques employs a knowledge domain specific dictionary.

85. The method of claim 71, wherein at least one of the artificial intelligence pattern recognition techniques employs a behavior recognizer.

86. The method of claim 71, wherein at least one of the artificial intelligence pattern recognition techniques employs a Bayesian filter.

87. The method of claim 71, wherein at least one of the artificial intelligence pattern recognition techniques employs a neural-network filter.

88. The method of claim 71, wherein at least one of the artificial intelligence pattern recognition techniques employs an emotion filter.

* * * * *